(12) United States Patent
Hamilton et al.

(10) Patent No.: US 11,614,890 B2
(45) Date of Patent: Mar. 28, 2023

(54) HANDLING OF HOST-INITIATED REQUESTS IN MEMORY SUB-SYSTEMS

(71) Applicant: Micron Technology, Inc., Boise, ID (US)

(72) Inventors: Marc S. Hamilton, Eagle City, ID (US); Suresh Rajgopal, San Diego, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/526,649

(22) Filed: Jul. 30, 2019

(65) Prior Publication Data
US 2021/0034290 A1 Feb. 4, 2021

(51) Int. Cl.
*G06F 3/06* (2006.01)

(52) U.S. Cl.
CPC .......... *G06F 3/0659* (2013.01); *G06F 3/0611* (2013.01); *G06F 3/0679* (2013.01)

(58) Field of Classification Search
CPC ..... G06F 3/0659; G06F 3/0611; G06F 3/0679
USPC ....................................................... 711/158
See application file for complete search history.

(56) References Cited

U.S. PATENT DOCUMENTS

| 7,082,494 B1 * | 7/2006 | Thelin ................... G06F 3/0611 |
| | | 369/47.1 |
| 9,620,242 B1 * | 4/2017 | Roach .............. G11C 29/50004 |
| 2004/0117791 A1 | 6/2004 | Prasad et al. |
| 2009/0132754 A1 * | 5/2009 | Riska .................... G06F 3/0611 |
| | | 711/103 |
| 2009/0276781 A1 | 11/2009 | Chan et al. |
| 2012/0203986 A1 * | 8/2012 | Strasser ................ G06F 3/0688 |
| | | 711/158 |
| 2013/0097349 A1 | 4/2013 | Lu et al. |
| 2014/0075105 A1 * | 3/2014 | Colgrove ............ G06F 11/3409 |
| | | 711/103 |
| 2015/0006786 A1 * | 1/2015 | Cabrera .............. G06F 12/0246 |
| | | 711/103 |
| 2016/0313946 A1 | 10/2016 | Zang et al. |
| 2017/0269852 A1 * | 9/2017 | Lin ..................... G11C 16/3427 |
| 2018/0314448 A1 * | 11/2018 | Grossman ........... G06F 12/0238 |
| 2019/0050312 A1 * | 2/2019 | Li ....................... G06F 11/1044 |

FOREIGN PATENT DOCUMENTS

KR 20160313946 A 3/2015

OTHER PUBLICATIONS

International Search Report and Written Opinion for International Application No. PCT/US2020/044031, dated Oct. 27, 2020, 12 pages.

* cited by examiner

*Primary Examiner* — Gautam Sain
(74) *Attorney, Agent, or Firm* — Lowenstein Sandler LLP (57) ABSTRACT

One or more requests are received from a host system while a media management scan is in progress on a memory component in a memory sub-system. The media management scan in progress is suspended. The request received from the host system are serviced. Once the host system is serviced, the media management scan is resumed on the memory component.

19 Claims, 5 Drawing Sheets

HANDLING OF HOST-INITIATED REQUESTS IN MEMORY SUB-SYSTEMS

TECHNICAL FIELD

The present disclosure generally relates to a memory sub-system, and more specifically, relates to servicing high-priority read and/or write requests received from a host system.

BACKGROUND

A memory sub-system can be a storage system, a memory module, or a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to improved handling of host-initiated requests in a memory sub-system by servicing high-priority read and/or write requests using standard datasheet commands associated with the type of memory component being used in the memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A memory sub-system periodically undergoes scheduled media management scans, where the integrity of memory components is checked to determine error correction needs for data stored in the memory sub-system. The periodic media management scan can run in the background irrespective of whether the memory sub-system is currently servicing an active request (e.g., read and/or write request) received from the host system. In conventional memory systems, there is no efficient mechanism for prioritizing the requests received from the host system over requests received from other components, such as media management scan requests initiated by a controller within the memory sub-system. Requests received from the host system are considered high-priority requests. In conventional systems, high-priority requests are placed by a scheduler in a same queue as other requests, such as media management scan requests. Therefore, latency can be adversely affected, which in turn negatively impacts the overall Quality-of-Service (QoS) of a system. QoS is a common industry term that is frequently used to describe a distribution of command latencies within a system. In conventional systems, prioritizing host requests (e.g., read requests received from the host system) to improve QoS can be accomplished by managing firmware behavior, or, by time-multiplexing host read traffic with media management scans. However, these approaches do not offer fine-grained control at the memory component level.

Aspects of the present disclosure address the above and other deficiencies by allowing an in-progress media management scan to be suspended in order to accommodate higher priority read/write requests received from the host system. Standard datasheet commands (i.e., standard commands used to program memory components) based on the type of memory component used in the memory sub-system are used to achieve component-level fine-grained control of latency.

An advantage of the present disclosure is that when standard datasheet commands are used to suspend an in-progress media management scan, many of the other device configuration settings of the memory components remain unchanged. Therefore, suspending an in-progress media management scan imparts minimal performance penalty.

Figure 1:
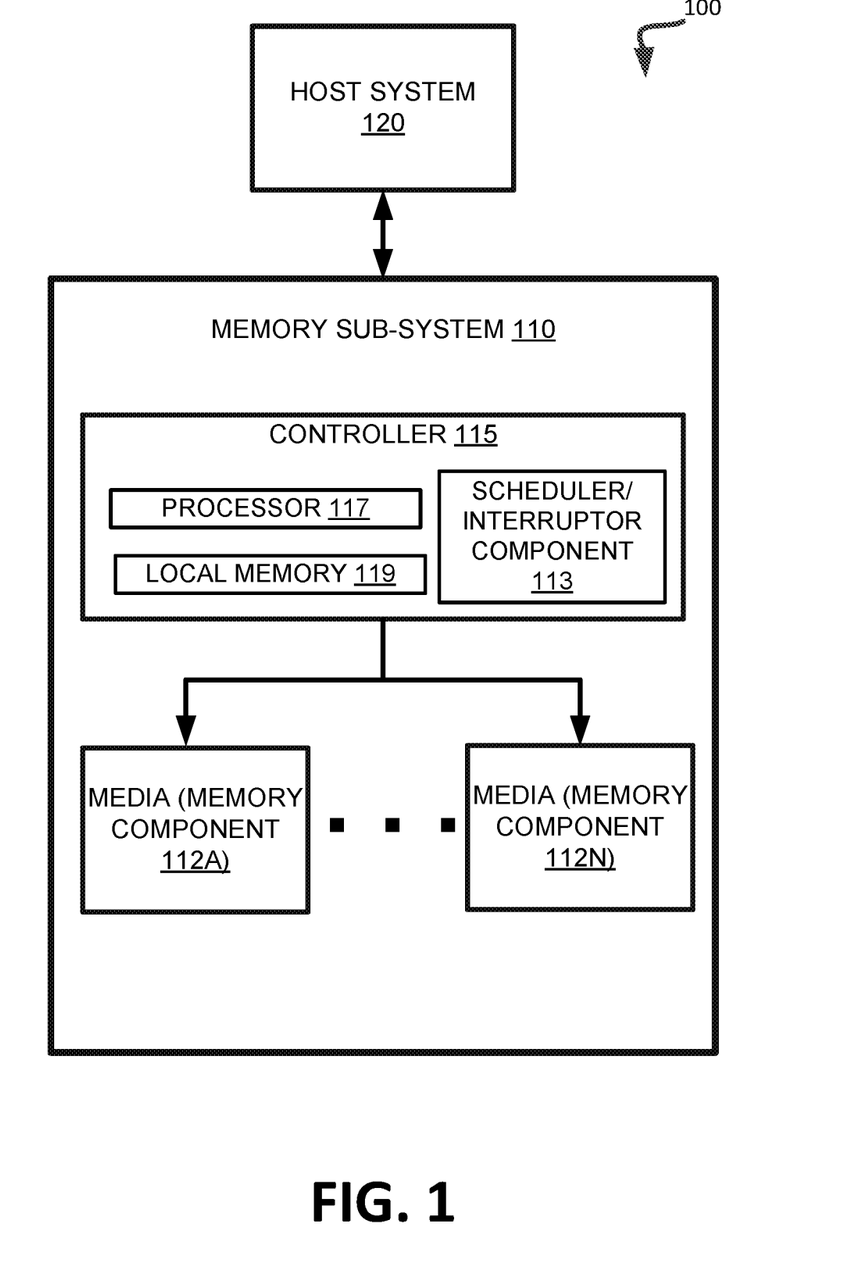
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data. Note that the techniques described in this disclosure is agnostic of what type of memory technology is being used.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a scheduler/interruptor component 113 that can prioritize host-initiated requests over scheduled media management scans. In some embodiments, the controller 115 includes at least a portion of the scheduler/interruptor component 113. For example, the controller 115 can include a processor 117 (processing device) configured to execute instructions stored in local memory 119 for performing the operations described herein.

The scheduler/interruptor component 113 can receive one or more requests from the host system (i.e., host-initiated requests). The host-initiated requests can be sent by the host system 120 and can indicate one or more memory operations (e.g., a read operation, write operation, etc.) to be performed on memory components 112A to 112N of memory sub-system 110. The scheduler/interruptor component 113 can recognize the higher priority of these host-initiated requests compared to media management scan requests. The media management scans can be scheduled. For example, a schedule for performing media management scans can be programmed into processing logic (e.g., firmware) of the controller 115. The scheduler/interruptor component 113 can suspend an in-progress media management scan based on the higher priority of the read/write requests received from the host system. Further details with regards to the operations of the scheduler/interruptor component 113 are described below.

Figure 2:
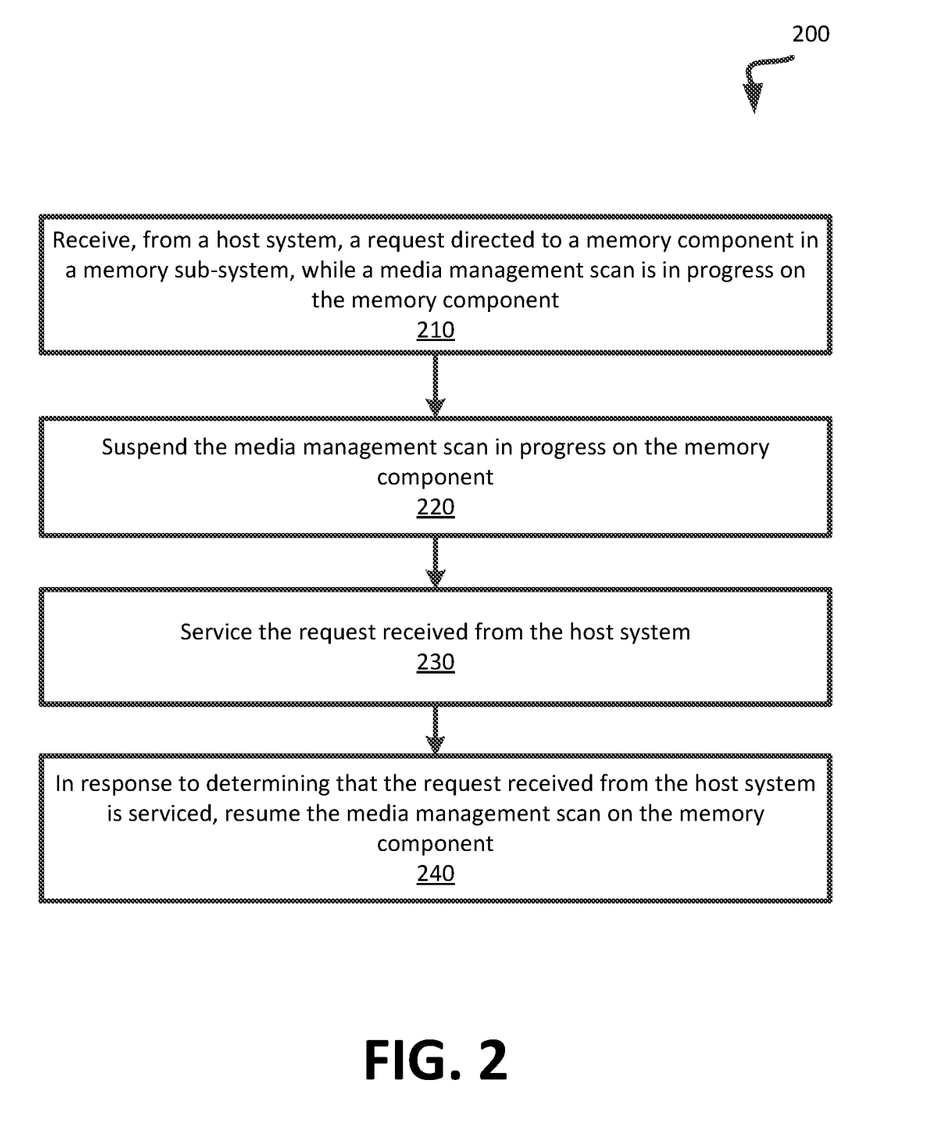
FIG. 2 is a flow diagram of an example method of servicing one or more requests received from a host system, according to an embodiment of the present disclosure.

FIG. 2 is a flow diagram of an example method 200 to service a request received by a memory sub-system from the host system. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 can be performed by the scheduler/interruptor component 113 and the processor 117 of the controller 115 of FIG. 1.

At operation 210, a processing device receives a request from a host system. The host-initiated request can be received while a media management scan is in progress on a particular memory component, e.g. a memory component 112 to which the host-initiated request is directed. The host-initiated requests can be read requests, write requests, or mixed read/write requests (i.e. where read requests and write requests are interleaved). The memory sub-system can pro-actively manage media errors by periodically reading media components to scan for various types of errors. For example, in a NAND flash memory-based SSD, processing logic included in the memory sub-system can periodically run an integrity scan (a type of media management scan) to check for bit errors. In FIG. 1, the processor 117 can execute the media management scan algorithm. The periodicity of running the media management scan can be preprogrammed or can be configurable. As the bit density in the memory component increases (e.g., in QLC-based NAND), the media management scan algorithms need to manage a higher possibility of bit errors by performing the media management scan more frequently, which can lead to having to run the media management scan during non-idle time, i.e. during a period of time when the memory sub-system is servicing host-initiated requests. Therefore, the probability of a media management scan request colliding with a host-initiated request increases for certain types of memory sub-systems along with increasing bit density. A 'collision' of a media management scan request with the host-initiated request can occur when host-requested data is physically on a memory component that is currently being scanned. Note that the scheduler/interruptor component 113 can schedule servicing of host-initiated requests asynchronously to a scheduled media management scan to avoid collision, i.e. the host-initiated requests are serviced when media management scan is not scheduled. In an embodiment, a firmware scheduling mechanism (e.g., a code executed by the scheduler/interruptor component 113) can initiate the media management scan by various methods, such as by periodic time-based intervals, by counting the number of host reads to a physical media location, or a combination of the previous. Since firmware itself has initiated the scan, the memory sub-system is aware that the controller is busy performing the media management scan and therefore cannot perform a new operation to service the host-initiated request. However, if the in-progress media management scan is suspended, then the host-initiated request can be serviced sooner, benefiting the host with a faster command latency. Note that this disclosure is not limited to media management scan that is scheduled a priori.

At operation 220, the processing device suspends the media management scan in progress. In some embodiments, suspending a media management scan involves pausing an in-progress media management scan and maintaining a record of which memory components have been scanned up to the time when the scan is paused. In other embodiments, suspending a media management scan involves completely stopping the currently in-progress scan. In an embodiment, the mechanism to suspend the scan is by issuing a media reset command. The media reset command comprises a standard datasheet command depending on the type of memory component used. For example, in a NAND-based embodiment, the media reset command is a standard NAND RESET command, which preserves many of the NAND configuration settings (i.e., the values of the feature addresses). This effectively means that the scheduler/interruptor component 113 treats host-initiated requests as higher-priority requests and places the host-initiated requests above the media management scan requests.

At operation 230, the processing device services the one or more requests received from the host system. Servicing means providing requested data stored in the media to the host system or writing data received from the host system to the media. In an embodiment, a media reset command issued at operation 220 ensures that the processing logic (e.g., firmware) of the memory sub-system can service the host-initiated requests faster instead of waiting for the in-progress media management scan to complete. In an example embodiment using high density NAND, such as QLC-based media, page read times can be as much as 200 μs or more. Therefore, suspending the in-progress media management scan to service a host read can significantly improve latency.

At operation 240, in response to determining that the requests received from the host system are serviced, the processing device resumes the media management scan. The host system can send an acknowledgment signal to the processing device based on which the processing device can determine that the host-initiated request has been serviced. In some embodiments, resuming a media management scan can mean starting the media management scan from the previous point where the scan was paused (if a record is available to indicate which memory components have already been scanned). In other embodiments, resuming a media management scan can mean starting the media management scan afresh irrespective of memory components which were already scanned at the time the media management scan was suspended. In an embodiment where the media management scan is suspended using a standard datasheet command (e.g., a RESET command), the configuration settings remain intact, and the controller can simply issue a new read command to the memory component, effectively restarting the scan from the previous point where the scan was paused.

Figure 3:
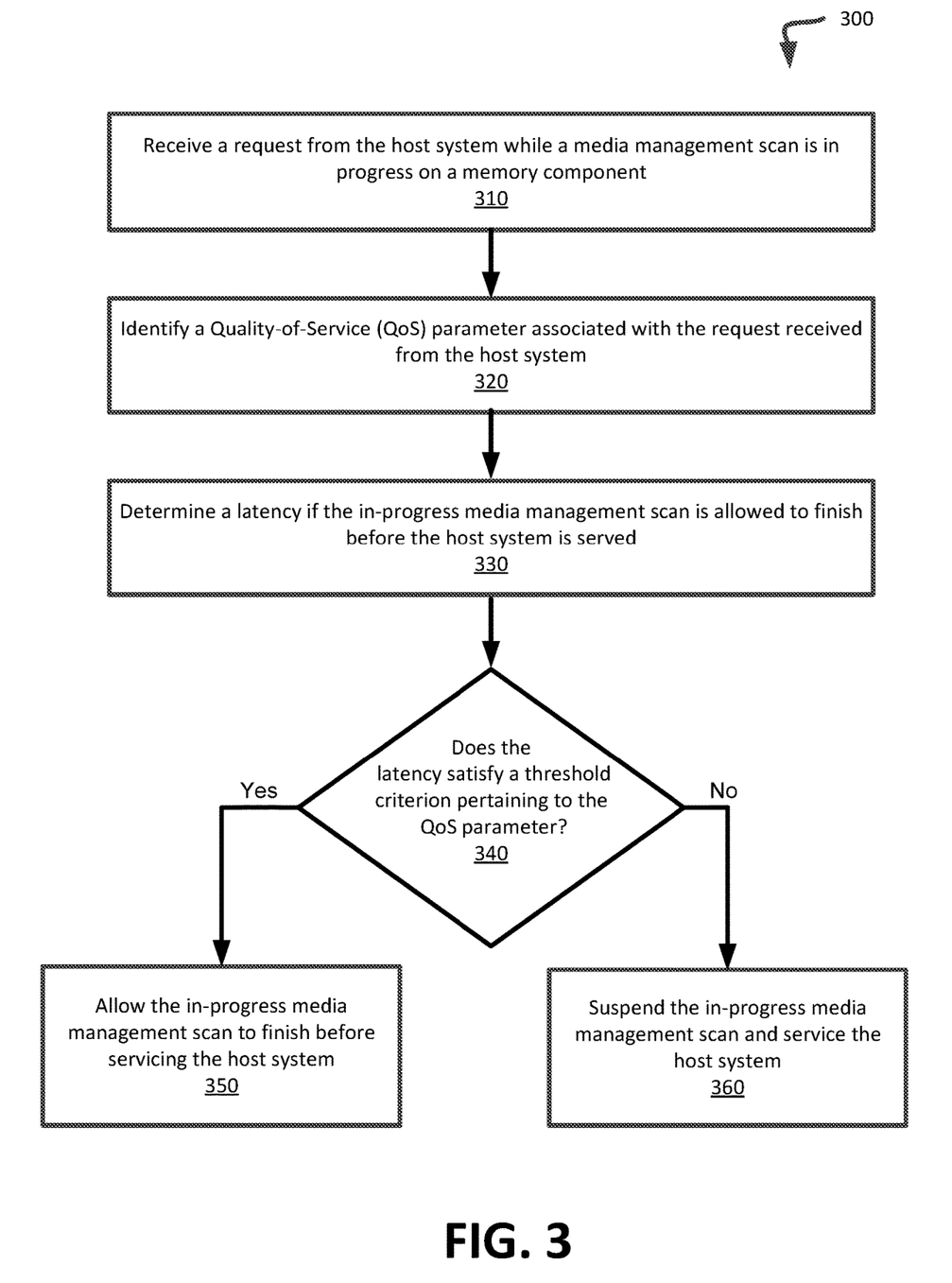
FIG. 3 is a flow diagram of an example method of making a decision on whether to suspend an in-progress media management scan in a memory sub-system, in accordance with some embodiments of the present disclosure.

FIG. 3 is a flow diagram of an example method 300 for determining whether to suspend an in-progress media management scan in a memory sub-system, or to allow the in-progress media management scan to finish. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 can be performed by the scheduler/interruptor component 113 and processor 117 of FIG. 1.

At operation 310, the processing device receives a request from a host system while a media management scan is in progress.

At operation 320, the scheduler/interruptor component 113 identifies a QoS parameter associated with the request received from the host system while the media management scan is in progress on a memory component. The QoS parameter can be embedded in the host-initiated request in a format that is identifiable by the by the scheduler/interruptor component 113, so that the scheduler/interruptor component 113 treats any request received from the host as higher priority request than a media management scan request, and establishes a threshold criterion pertaining to the QoS parameter. For example, the threshold criterion pertaining to the QoS parameter can be based on latency value, since QoS depends on latency. A latency is a delay between a host system requesting data and receiving the requested data from the memory component of the memory sub-system. If a determined value of latency is below a maximum allowable latency value needed to maintain the QoS, then the threshold criterion pertaining to the QoS parameter is satisfied. However, if a determined value of latency exceeds the maximum allowable latency value, then the threshold criterion is not satisfied, indicating the QoS will be adversely affected.

At operation 330, the processing device determines a hypothetical value of latency if the in-progress media management scan is allowed to finish before the host system is served, (i.e. if the scheduler/interruptor component 113 does not rearrange a queue to accommodate an incoming host-initiated request ahead of the media management scan). This determination can be performed by the processor 117 in FIG. 1 based on input received from the scheduler/interruptor component 113. In one implementation, in order to determine latency, the processing device can determine what portion of the media management scan is already completed. For example, in an embodiment, the processing device can determine a fraction of the scheduled media management scan in progress that is already completed. Since the processing logic knows what memory page is being read, the expected time duration of read is also known. The processing logic can make a decision to determine if the media management scan is closer to being finished, or whether the read operation for the memory page is towards the beginning. This determination can be performed by the processor 117 in FIG. 1.

Figure 5:
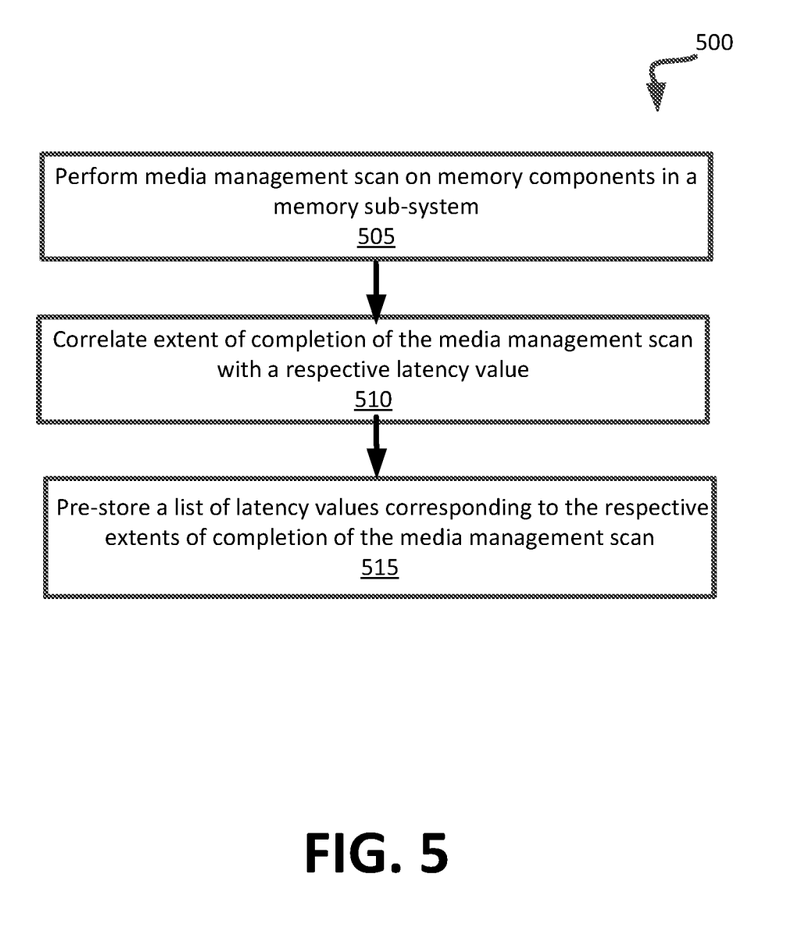
FIG. 5 is a flow diagram of an example method of pre-storing latency values correlated to an extent of completion of media management scan, according to an embodiment of the present disclosure.

The processing device can correlate the remaining portion of the media management scan with a corresponding latency value. As illustrated in the flowchart 500 of FIG. 5, in one implementation, a data structure (e.g., a table, array, record, etc.) is stored in local memory 119 to list respective latency values corresponding to the percentage of completion of the media management scan. To pre-store the list of latency values in the local memory 119, at operation 505, a media management scan is performed on the memory components 112 of the memory sub-system 110. At operation 510, respective latency values are determined as correlated with respective extents of completion of the media management scan. At operation 515, a list of latency values is pre-stored corresponding to the respective extents of completion of the media management scan. In one implementation, at the time a host request is received while a media management scan is in progress, the scheduler/interruptor component 113 identifies a corresponding percentage of scan completion entry from the data structure to read out an applicable latency value from the pre-stored list of latency values.

At operation 340, the processing device determines whether the latency satisfies the threshold criterion pertaining to the QoS parameter associated with the host-initiated request.

Responsive to determining (at operation 340) that the determined latency does satisfy the threshold criterion pertaining to the QoS parameter, the processing device allows the in-progress media management scan to finish (at operation 350) before servicing the host system. As described above, when the determined latency satisfies the threshold criterion pertaining to the QoS parameter, there is no need to suspend an in-progress media management scan, as the QoS is not affected, i.e. the host-initiated request is still serviced within an acceptable time, and there is no performance penalty for allowing the in-progress scan to finish.

On the other hand, responsive to determining (at operation 340) that the determined latency does not satisfy the threshold criterion pertaining to the QoS parameter (i.e. the determined latency is long enough to negatively affect the QoS), at operation 360, the processing device suspends the in-progress media management scan to service the host system, per operations 220-240 of method 200.

Persons skilled in the art will understand that although the flow diagrams in FIGS. 2-3 show a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 4:
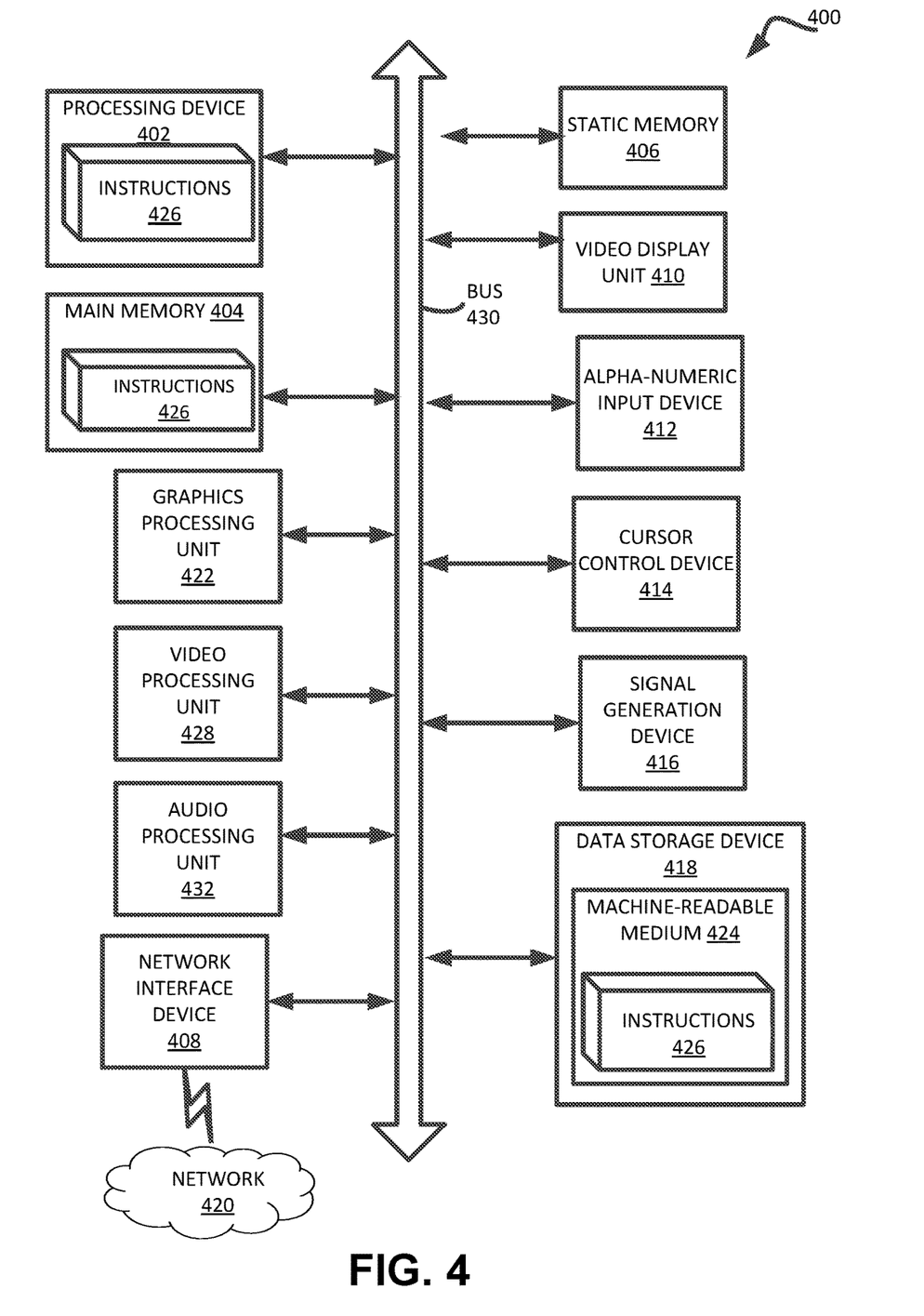
FIG. 4 is a block diagram of an example computer system in which implementations of the present disclosure can operate.

FIG. 4 illustrates an example machine of a computer system 400 within which a set of instructions, for causing the machine to perform any one or more of the methodologies discussed herein, can be executed. For example, the computer system 400 can include or utilize a storage device (e.g., the storage device 110 of FIG. 1) or can be used to perform the operations of a controller (e.g., to execute an operating system to perform operations corresponding to the scheduler/interruptor component 113 of FIG. 1). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device can be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computer system 400 can further include a network interface device 408 to communicate over the network 420. The computer system 400 also can include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 can include a machine-readable storage medium 424 (also known as a computer-readable medium) on which is stored one or more sets of instructions or software 426 embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage device 418, and/or main memory 404 can correspond to the storage device 110 of FIG. 1.

In one implementation, the instructions 426 include instructions to implement functionality corresponding to a specific component (e.g., scheduler/interruptor component 113 of FIG. 1). While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "servicing" or "issuing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   pre-storing a list of values of latency corresponding to respective extents of completion of a media management scan, wherein the media management scan is performed on a plurality of memory components in a memory sub-system;
   receiving, from a host system, a request directed to a memory component of the plurality of memory components in the memory sub-system, while a media management scan is in progress;
   determining, by a processing device, an extent of completion of the media management scan in progress at a time when the request from the host system was received;
   determining, from the list, a latency corresponding to the determined extent of completion of the media management scan in progress, wherein the latency is associated with servicing the request if the media management scan in progress is allowed to finish before the host system is serviced;
   determining, by the processing device, whether the latency exceeds a maximum allowable latency value;
   deciding, by the processing device, based on determining whether the latency exceeds the maximum allowable latency value, whether or not to suspend the media management scan in progress;
   in response to determining that the latency exceeds the maximum allowable latency value, suspending, by the processing device, the media management scan in progress by causing a media reset command to be issued;
   maintaining, by the processing device, a record of which memory components among the plurality of memory components have been scanned up to a time when the media management scan in progress is suspended;
   servicing the one or more requests received from the host system; and
   in response to determining that the one or more requests received from the host system are serviced, resuming the media management scan on memory components among the plurality of memory components that have not been scanned yet according to the record.

2. The method of claim 1, wherein the request received from the host system comprises one or more read requests.

3. The method of claim 1, wherein the request received from the host system comprises one or more write requests.

4. The method of claim 1, wherein the media management scan comprises an integrity scan that runs periodically as a background operation of the memory sub-system for error correction.

5. The method of claim 1, wherein the memory sub-system comprises NAND-based memory components.

6. The method of claim 1, wherein the media reset command comprises a standard datasheet command associated with a type of memory component used in the memory sub-system.

7. The method of claim 1, wherein the memory sub-system comprises at least one of single level cell (SLC), triple level cell (TLC), or quad-level cell (QLC)-type memory cells, or a combination thereof.

8. The method of claim 1, wherein the media management scan is scheduled a priori.

9. The method of claim 8, wherein the request received from the host system is asynchronous to the scheduled media management scan.

10. A method comprising:
    pre-storing a list of values of latency corresponding to respective extents of completion of a media management scan, wherein the media management scan is performed on a plurality of memory components in a memory sub-system;
    receiving, from a host system, a request directed to a the memory component of the plurality of memory components in the memory sub-system, while a media management scan is in progress;
    identifying, by a processing device, a Quality-of-Service (QoS) parameter associated with the request received from the host system;
    maintaining, by the processing device, a record of which memory components among the plurality of memory components have been scanned up to a time when the request from the host system was received;
    determining, by a processing device, an extent of completion of the media management scan in progress at the time when the request from the host system was received;
    determining, from the list, a latency corresponding to the determined extent of completion of the media management scan in progress, wherein the latency is associated with servicing the request if the media management scan in progress is allowed to finish before the host system is serviced;
    determining, by the processing device, whether the latency exceeds a maximum allowable latency value pertaining to the QoS parameter associated with the request received from the host system; and
    suspending the media management scan in progress by causing a media reset command to be issued, based on determining, by the processing device, that the latency exceeds the maximum allowable latency value.

11. The method of claim 10, further comprising:
    servicing the one or more requests received from the host system; and
    in response to determining that the one or more requests received from the host system are serviced, resuming the media management scan on memory components among the plurality of memory components that are not scanned yet according to the record.

12. The method of claim 10, further comprising:
    in response to determining that the latency does not exceed a maximum allowable latency value, allowing the media management scan in progress to finish; and
    in response to determining that the media management scan has finished, servicing the request received from the host system.

13. The method of claim 10, wherein the request received from the host system comprises one or more read requests.

14. The method of claim 10, wherein the request received from the host system comprises one or more write requests.

15. The method of claim 10, wherein the media management scan comprises an integrity scan that runs periodically in a background of the memory sub-system for error correction.

16. The method of claim 10, wherein the media reset command comprises a standard datasheet command associated with a type of memory component used in the memory sub-system.

17. A system comprising:
    a plurality of memory components; and a processing device, operatively coupled to the memory components, to:

pre-store a list of values of latency corresponding to respective extents of completion of a media management scan, wherein the media management scan is performed on a plurality of memory components in a memory sub-system;

receive, from a host system, a request directed to a memory component of the plurality of memory components, while a media management scan is in progress;

maintain a record of which memory components among the plurality of memory components have been scanned up to the time when the request from the host system was received;

determine, by a processing device, an extent of completion of the media management scan in progress at the time when the request from the host system was received;

determine, from the list, a latency corresponding to the determined extent of completion of the media management scan in progress, wherein the latency is correlated with scanning remaining memory components among the plurality of memory components that are not scanned yet; and suspend the media management scan in progress by causing a media reset command to be issued, based on determining that the latency exceeds a maximum allowable latency value pertaining to a Quality of Service (QoS) associated with the request received from the host system.

18. The system of claim 17, wherein the processing device is further to:

service the request received from the host system; and in response to determining that the request received from the host system is serviced, resume the media management scan on memory components among the plurality of memory components that are not scanned yet according to the record.

19. The system of claim 17, wherein the processing device is further to:

in response to determining that that the latency does not exceed the maximum allowable latency value, allow the media management scan in progress on the plurality of memory components to finish; and in response to determining that the media management scan has finished, service the request received from the host system.

* * * * *